United States Patent [19]

Dodd

[11] 4,163,207

[45] Jul. 31, 1979

[54] TIRE DEFLATION WARNING DEVICE

[75] Inventor: Alan M. Dodd, Walsall, England

[73] Assignee: Dunlop Limited, England

[21] Appl. No.: 692,190

[22] Filed: Jun. 2, 1976

[30] Foreign Application Priority Data

Jun. 4, 1975 [GB] United Kingdom ............... 24046/75

[51] Int. Cl.² ............................................. B60C 17/00
[52] U.S. Cl. ..................................... 340/58; 116/34 B;
152/330 L; 152/330 RF
[58] Field of Search ............. 340/58; 116/34 R, 34 A,
116/34 B; 200/61.22, 61.23, 61.24; 73/146.3,
146.8, 146; 152/209 R, 209 D

[56] References Cited

U.S. PATENT DOCUMENTS

| | | | |
|---|---|---|---|
| 1,764,076 | 6/1930 | Hayes | 116/34 B |
| 1,860,362 | 5/1932 | Jones | 116/34 B |
| 2,227,074 | 12/1940 | Erickson | 116/34 |
| 2,368,617 | 2/1945 | Rykken | 340/58 X |
| 2,800,098 | 7/1957 | Crosby, Jr. | 116/34 |
| 3,154,048 | 10/1964 | Neu | 340/58 X |
| 3,400,745 | 9/1968 | Schwartz | 152/209 R |
| 3,850,217 | 11/1974 | Edwards et al. | 152/330 RF |
| 3,931,843 | 1/1976 | Edwards et al. | 152/330 L |

FOREIGN PATENT DOCUMENTS

| | | |
|---|---|---|
| 1103165 | 3/1961 | Fed. Rep. of Germany . |
| 1187941 | 9/1959 | France . |
| 1393493 | 2/1965 | France . |
| 2183615 | 12/1973 | France . |
| 313393 | 6/1929 | United Kingdom . |
| 907277 | 10/1962 | United Kingdom . |

*Primary Examiner*—Alvin H. Waring
*Attorney, Agent, or Firm*—Stevens, Davis, Miller & Mosher

[57] ABSTRACT

Tire deflation warning device comprising means for producing a noise which will not be suppressed by the vehicle suspension and will give a warning to the vehicle driver of the tire deflation.

6 Claims, 6 Drawing Figures

FIG.3
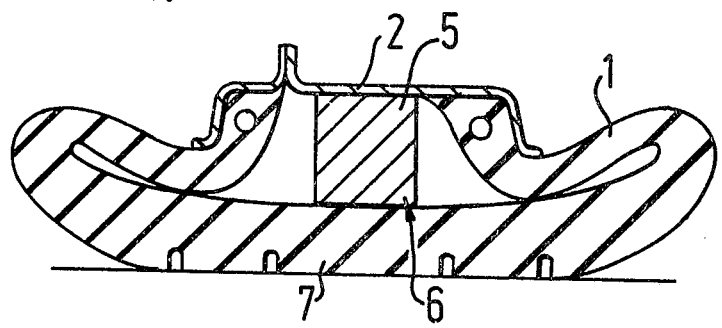
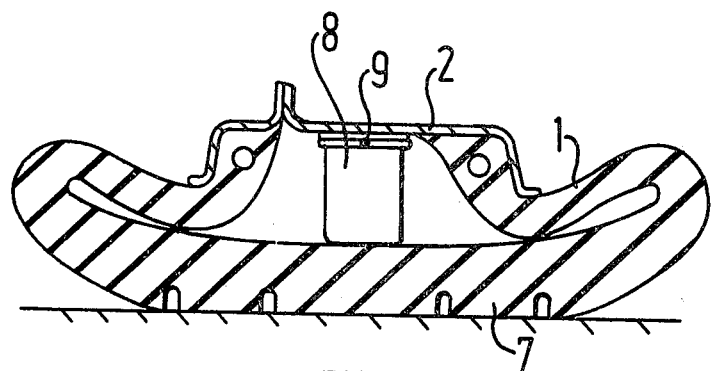
FIG.5

TIRE DEFLATION WARNING DEVICE

This invention relates to a tire deflation warning device. It may be used with conventional vehicle tires or with vehicle tire and wheel assemblies which are constructed so as to be able to be used in a substantially deflated condition. The latter type of tire and wheel assemblies provide for continued use of the vehicle but it is necessary that the driver is aware of the deflation so that the safe distance for deflated operation and/or the maximum safe speed are not exceeded.

Modern road vehicles have their suspension "tuned" for radial tires and the suspensions act as a low-pass filters with respect to low frequency disturbances. Thus noise generated by a single pulse per revolution of a wheel at usable vehicle speeds is damped in the suspension. Noises in this category include wheel hop and longitudinal natural frequencies. Higher frequencies, however, are passed from the wheels to the vehicle body and this effect is useful in advising the driver of some failures such as for example failure of a wheel bearing.

According to the present invention a tire deflation warning device for a road vehicle comprises noise producing means provided on a tire and wheel assembly to produce disturbing noise frequencies in the range of 80–280 Hz when the tire is running at normal road speeds in a deflated condition, the said frequencies being transmittable through a vehicle suspension to the vehicle body.

The noise producing means may comprise a "noisy formation" on the tire and wheel assembly which is only contacted when the tire is deflated. The "noisy formation" preferably contacts the road but may also contact other portions of the tire or the vehicle and may, for example consist of flats equi-spaced around the wheel rim flange.

Alternative noise producing means may comprise a saddle located on the wheel which contacts the inner surface of the tire tread when the tire is deflated the saddle or the inner surface of the tire tread or both having the required noise producing surface formations.

Still another noise producing means may comprise a band of generally cylindrical containers as used with some tires designed for safe running in a generally deflated condition to hold lubricant and/or puncture sealant materials. In this case sufficient containers are provided around the band to give the required number of bumps per revolution of the wheel and thus act as a noisy formation.

A preferred number of formations is 11 for a 13" diameter tire which produces approximately 80 Hz at 30 mph and approximately 280 Hz at 100 mph. (for a 165-13 tire, e.g. 81.5 Hz at 30 mph+272 Hz at 100 mph).

The frequencies generated provide a harsh grating boom which is not nauseous to vehicle passengers but which is noticeable. Conveniently the range of frequencies is arranged to ensure noise at a maximum of 280 Hz is generated at the maximum speed of the vehicle.

The minimum frequency of 80 Hz is approximately the lower limit of the "zither" frequency band and the maximum frequency of 280 Hz approximates to the resonant frequency of the air inside a tire.

Three embodiments of the invention will now be described by way of example only with reference to the accompanying drawings of which:

FIG. 3 shows a cross-section in a radial plane through part of the tire and wheel assembly the tire being deflated and the assembly provided with a device according to the second embodiment.

FIG. 5 shows a cross-section in a radial plane through part of a tire and wheel assembly, the tire being deflated and the assembly provided with a device according to the third embodiment.

Figure 1:
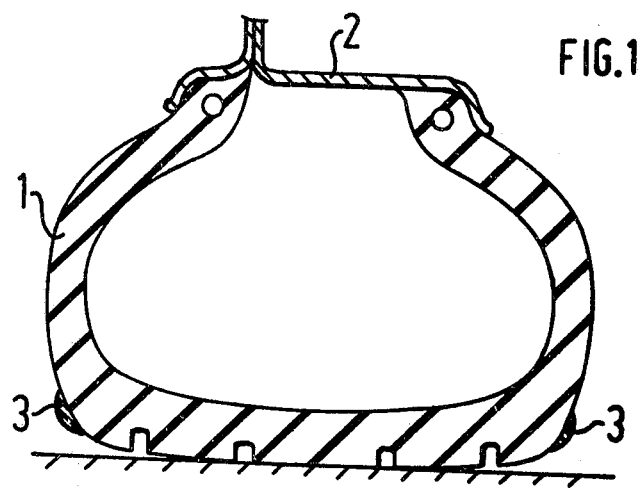
FIG. 1 shows a cross-section in a radial plane through part of a tire and wheel assembly the tire being inflated to its normal operating pressure and provided with a device according to the first embodiment.
Figure 2:
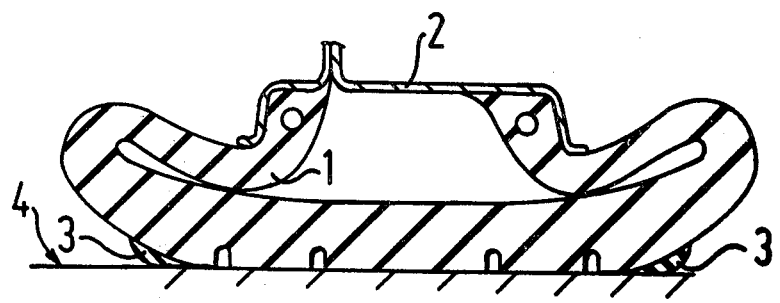
FIG. 2 shows the tire and wheel as shown in FIG. 1, the tire being deflated.

FIG. 1 shows a tire 1 capable of running in a deflated condition mounted on a wheel rim 2. The upper sidewalls of the tire 1 are each provided with a plurality of rubber projections 3 spaced apart regularly around the tire. The projections are positioned so that when the tire is running in a deflated condition as shown in FIG. 2 they contact the road surface 4 to set up a vibration which is transmitted through the suspension of the vehicle to which the tire and wheel assembly is fitted to the vehicle body. This vibration is detected as a disturbing noise by the driver. The frequency of the vibration generated depends on the number of projections and for a 13" diameter tire the preferred number is eleven, each projection on one side of the tire being in axial alignment with a projection on the opposite side of the tire.

Figure 4:
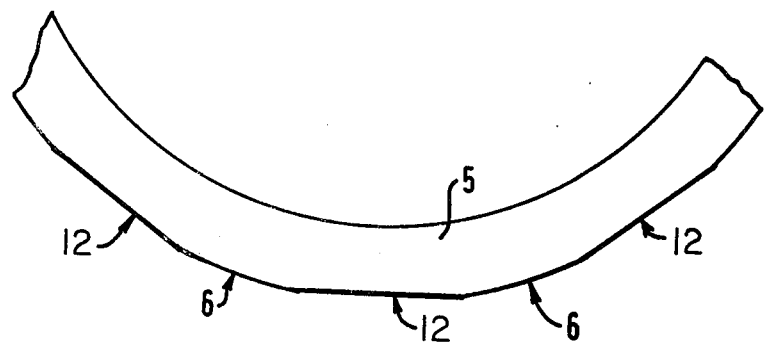
FIG. 4 shows a side view of part of the device of the second embodiment.
Figure 6:
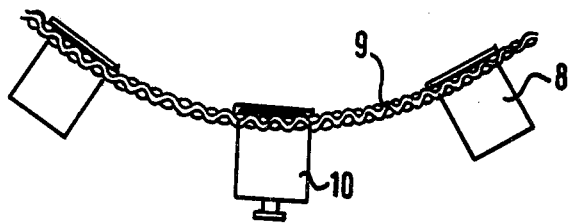
FIG. 6 shows a side view of part of the device of the third embodiment.

FIG. 3 shows a tire 1 capable of running in a deflated condition mounted on a wheel rim 2. The rim is provided with an annular support saddle 5 comprising a ring of plastics material, e.g. high density polyethylene, the outer surface 6 of which contacts the inner surface of the tire tread 7 when the tire is running in a deflated condition, the ring supporting part of the weight of the vehicle. As can be seen in FIG. 4 the radially outer surface 6 of the support ring 5 is provided with a plurality of flat surfaces 12. As the tire and wheel assembly revolves with the tire in a deflated condition the flats 12 on the support saddle 5 generate a vibration which is transmitted through the suspension of the vehicle to which the tire and wheel assembly is fitted to the vehicle body. The vibration is detected as a disturbing noise by the driver. The frequency of the vibration generated depends upon the number of flats 12 provided on the support ring 5 and for a 13" diameter tire the preferred number is 11.

FIG. 5 shows a tire 1 capable of running in a deflated condition mounted on a wheel rim 2. Attached to the wheel rim is a harness 9 comprising two wires twisted together supporting a plurality of cylinders 8 and lubricant containers 10 which are of cylindrical shape. When the tire 1 is running in a deflated condition lubricant is released from the containers 10 to reduce the frictional heat generated between interior rubbing surfaces of the tire. The outer surfaces of the containers 10 and the cylinders 8 contact the inner surface of the tire tread 7 during the running of the tire and set up a vibration which is transmitted through the suspension of the vehicle to which the tire and wheel assembly is fitted to the vehicle body. This vibration is detected as a disturbing noise by the driver. The frequency of the vibration generated depends on the total number of cylinders and lubricant containers and for a 13″ diameter tire the preferred number is 11. It will be appreciated that the cylinders 8 may be replaced by other lubricant containers 10, or the containers 10 replaced by other cylinders 8.

Having now described my invention what I claim is:

1. A tire deflation warning device for a road vehicle comprising noise producing means on a single inflation chamber tire and wheel assembly to produce disturbing noise frequencies in the range of 80 to 280 Hz only when the tire is running at normal road speeds in a deflated condition, said frequencies being transmittable through a vehicle suspension to the vehicle body, the noise producing means comprising a noisy formation situated inside said single inflation chamber and positioned to contact the assembly other than at the noisy formation itself to generate a disturbing noise frequency as the tire runs in a deflated condition.

2. A tire deflation warning device according to claim 1 wherein the noisy formation consists of flats equally spaced around a rim flange of the wheel which generate a disturbing noise frequency as the tire runs in a deflated condition.

3. A tire deflation warning device for a road vehicle comprising noise producing means provided on a single inflation chamber tire and wheel assembly to produce disturbing noise frequencies in the range of 80 to 280 Hz only when the tire is running at normal road speeds in a deflated condition, said frequencies being transmittable through a vehicle suspension to the vehicle body, the noise producing means comprising a saddle located on the rim of the wheel, the outer surface of which contacts the inner surface of the tire tread when the tire is deflated, at least one of the outer surface of the saddle and the inner surface of the tire tread having the required noise producing surface formations.

4. A tire deflation warning device according to claim 3 wherein the saddle is provided with a plurality of flats around the outer surface thereof.

5. A tire deflation warning device for a road vehicle comprising noise producing means provided on a single inflation chamber tire and wheel assembly to produce disturbing noise frequencies in the range of 80 to 280 Hz only when the tire is running at normal road speeds in a deflated condition, said frequencies being transmittable through a vehicle suspension to the vehicle body, the noise producing means comprising a band of containers for containing a lubricant which can be released into the inflation chamber on deflation of the tire, the outer surfaces of said containers contacting the inner surface of the tire when the tire is running in a deflated condition to generate the disturbing noise frequencies.

6. A tire deflation warning device according to claim 5 wherein the containers are cylinders.

* * * * *